United States Patent
Walker

[11] Patent Number: 5,849,148
[45] Date of Patent: Dec. 15, 1998

[54] DISTRIBUTOR PLATE AND EVAPORATOR

[75] Inventor: Michael L. G. Walker, Victoria, Australia

[73] Assignee: Ancon Chemical Pty. Ltd., Victoria, Australia

[21] Appl. No.: 591,596

[22] PCT Filed: Aug. 9, 1994

[86] PCT No.: PCT/AU94/00457

§ 371 Date: Feb. 9, 1996

§ 102(e) Date: Feb. 9, 1996

[87] PCT Pub. No.: WO95/05226

PCT Pub. Date: Feb. 23, 1995

[30] Foreign Application Priority Data

Aug. 12, 1993 [AU] Australia .................................. PM0804
Nov. 1, 1993 [WO] WIPO ....................... PCT/AU93/00564
Apr. 15, 1994 [AU] Australia .................................. PM5115

[51] Int. Cl.⁶ ............................... B01D 1/22; B01D 1/26; B01D 1/24
[52] U.S. Cl. ..................... 159/13.2; 159/17.2; 159/20.1; 159/27.1; 159/27.4; 159/43.1; 159/49; 159/DIG. 8; 134/22.16; 134/22.17; 134/22.19; 134/170; 165/95; 426/588
[58] Field of Search ................................ 159/13.2, 17.2, 159/20.1, 27.1, 27.4, 27.5, 43.1, 44, 49, DIG. 8, DIG. 13; 202/173, 174; 134/22.16, 22.17, 22.19, 170; 165/95; 99/453, 454; 426/471, 588

[56] References Cited

U.S. PATENT DOCUMENTS

| | | |
|---|---|---|
| 2,519,618 | 8/1950 | Walker et al. ........................... 159/27.1 |
| 2,647,570 | 8/1953 | Lockman . | |
| 3,099,607 | 7/1963 | Lustenader et al. ..................... 202/174 |
| 3,132,064 | 5/1964 | Scheffers ................................ 159/43.1 |
| 3,351,119 | 11/1967 | Rosenblad . | |
| 3,849,232 | 11/1974 | Kessier et al. . | |
| 5,004,043 | 4/1991 | Mucic et al. ........................... 159/43.1 |
| 5,246,541 | 9/1993 | Ryham ..................................... 159/49 |

FOREIGN PATENT DOCUMENTS 428968 12/1969 Australia .
417363 3/1970 Australia .

(List continued on next page.)

OTHER PUBLICATIONS

Derwent Abstract Accession No. 58813W/36, Class D14, Jol, DL 113844 (Flowberg. W), 5 Jul. 1975.
Chemical Engineer's Handbook, fifth Edition, Perr & Chilton McGraw–Hill Kogakusha Ltd. 18–31.
Brochure Rall Evaporator Cleaning Systems ("RECS") 1985 Europe.

*Primary Examiner*—Thomas M. Lithgow
*Attorney, Agent, or Firm*—Ladas & Parry

[57] ABSTRACT

An evaporator system including a plurality of effects arranged in series for progressively concentrating a liquid, the effects each including: a header chamber for receiving liquid to be concentrated; a multiplicity of tubes adapted to provide evaporation of liquid from the inner surfaces of the tubes and a perforated distributor plate located in the header chamber to distribute liquid to the openings of the tubes; and wherein the evaporator system is provided with a branched wash liquid feed line for providing parallel feeding of wash liquid to the header chambers of the effects onto the distributor plates therein. Each distributor plate comprises an essentially planar plate member having a multiplicity of distributor holes therein for distributing liquid to be evaporated to the multiplicity of tubes therebelow and a series of overflow conduits for providing a flow of wash liquid through the plate to the tubes. The inlets of the conduits are disposed at a height above the upper surface of the plate which is greater than the level of the liquid to be concentrated during liquid evaporation and the inlets provide rapid liquid flow during washing.

22 Claims, 8 Drawing Sheets

FOREIGN PATENT DOCUMENTS

| | | |
|---|---|---|
| 29754 | 6/1981 | European Pat. Off. . |
| 129128 | 12/1984 | European Pat. Off. . |
| 2232342 | 1/1975 | France . |
| 1519741 | 3/1970 | Germany . |
| 3530672 | 3/1986 | Germany . |
| 3904357 | 8/1990 | Germany . |
| 893633 | 4/1962 | United Kingdom . |
| 917715 | 2/1963 | United Kingdom . |
| 1063005 | 3/1967 | United Kingdom . |
| 1196493 | 6/1970 | United Kingdom . |
| 1206643 | 9/1970 | United Kingdom . |
| 8910172 | 11/1989 | WIPO . |

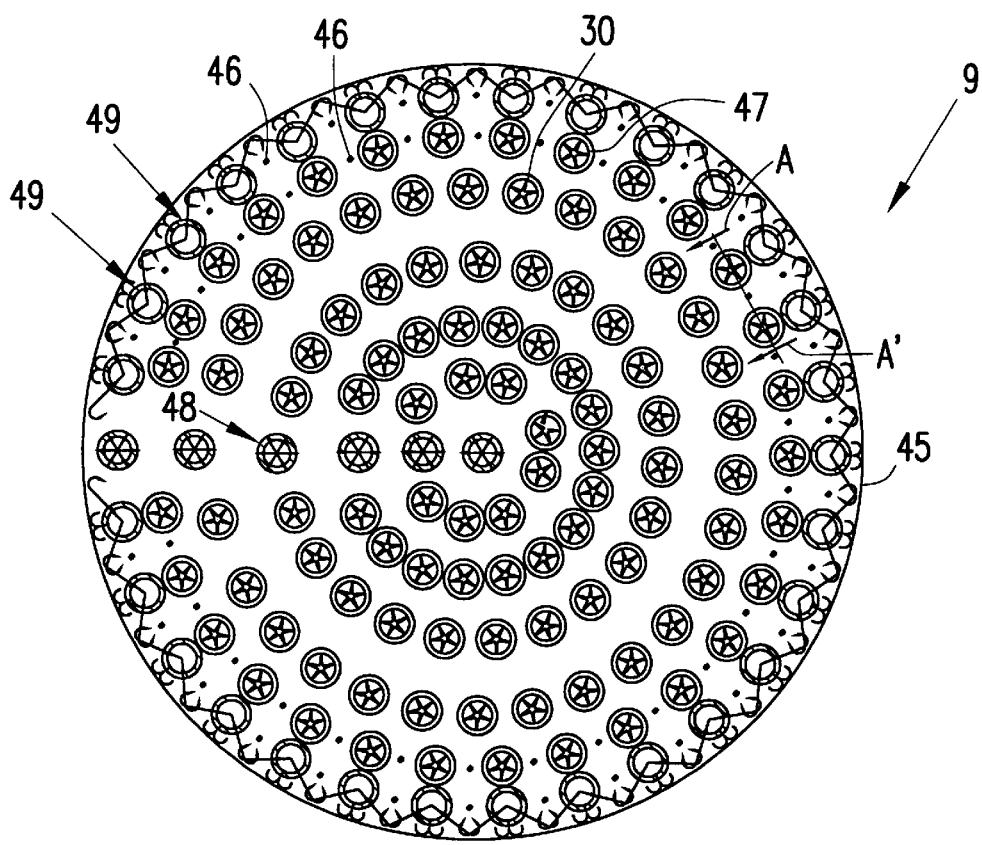
Fig. 6
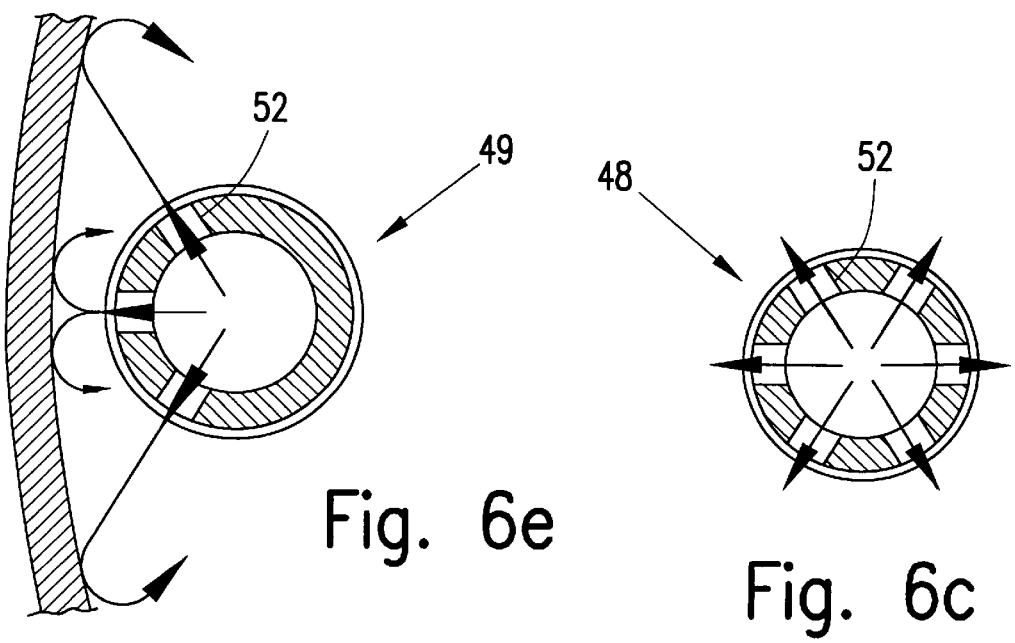
Fig. 6e
Fig. 6c

DISTRIBUTOR PLATE AND EVAPORATOR

FIELD OF THE INVENTION

The present invention relates to a distributor plate for a falling film evaporator for use in preparing concentrated liquids or powders such as powdered milk or the like, to an evaporator including such a distributor plate and to a method of use of the evaporator.

BACKGROUND

Falling film evaporators are widely used in the food processing industry to concentrate liquids such as milk, fruit juice, sugar solutions and the like. Evaporation occurs on the inner surfaces of tubes as the liquid falls as a film on their inner surfaces. The tubes may also be referred to as callandria. A perforated plate, known as a distributor plate, is mounted over the callandria so that a head of the liquid to be evaporated is produced on the plate resulting in an even distribution of liquid from the inlet above the plate to the openings of the callandria. Evaporator systems of this type often include a series of evaporative units each unit called an effect and including an inlet for the liquid to be evaporated, callandria within which evaporation is effected and a distributor plate disposed above the callandria to distribute the liquid to be evaporated to the openings of the callandria.

The distributor plate of the invention is particularly suited to use with evaporators which are used in the manufacture of concentrated milk products such as powdered milk and will be described with reference to that exemplary application. The evaporator of the invention is not however limited to that application and may be used in evaporation and concentration of other liquids such as sugar solutions, fruit juice and other beverages.

The evaporators used in concentration of milk and milk products such as skim milk and whey generally include a series of at least three and typically four effects and a finishing effect. The milk is passed through the callandria in each effect in the series to provide progressive concentration, the system being maintained under a vacuum and the callandria heated to facilitate evaporation.

During use of the evaporation system a crust known as "milk stone" forms on the surfaces of the equipment, particularly in the evaporation tubes and distributor plate, which if not removed results in reduction in efficiency of evaporation, reduction in product quality and blockage of the callandria which require expensive maintenance procedures. Washing of evaporator systems with wash solutions can reduce build up of contaminants however in order to keep the system clean regular washings of several hours each must be carried out together with frequent servicing. This significantly reduces production and involves high maintenance costs. There is a need for a system which provides efficient evaporation but which requires less maintenance and down time for cleaning.

SUMMARY OF THE INVENTION

The invention provides a distributor plate which provides efficient operation and improved system maintenance reducing the down time associated with maintenance and cleaning of equipment.

In one aspect the invention provides a distributor plate for a falling film evaporator the distributor plate including an essentially planar plate member having a multiplicity of distribution holes therein, the distributor plate being adapted to maintain a head of liquid thereon during evaporation to thereby regulate liquid flow and distribute liquid to be evaporated to callandria via said distribution holes, the distributor plate further comprising a series of overflow conduits for providing a flow of liquid through the plate during washing, the inlets of the overflow conduits being disposed above the surface of the plate to provide a further means of liquid flow to callandria during washing.

Preferably the inlets of the overflow conduits are at a height above the upper surface of the plate member greater than the head of liquid produced during evaporation. This is particularly preferred as it enables the distributor plate to regulate flow during evaporation to provide the appropriate flow rate and distribution for efficient evaporation while providing a means for rapid flow of wash liquid during washing.

The level of liquid achieved during evaporation will depend on the rate of flow of the liquid onto the distributor plate, the size of the distributor plate, the diameter of the holes in the distributor plate and the number of those holes. In the case of milk evaporators the level of liquid on the plate varies between different types and sizes of evaporative effect. The choice of suitable inlet height for the overflow conduits will therefore depend on the operating conditions and the particular effect design. The height of the inlet of the overflow conduits is preferably from 1.5 to 6 times the average level of product liquid. Typically the inlet of the conduits are in the range of from 12 to 250 mm above the upper surface of the plate. Preferably the inlets are from 12 to 150 mm above the surface of the plate.

Preferably the overflow conduits are of greater diameter than the distributor holes and more preferably at least twice the diameter of the distributor holes.

The distributor holes may for example be in the range of from 4 to 12 mm diameter and the overflow conduit in the range of 7 to 25 mm diameter.

The distributor holes and overflow conduits are preferably arranged in concentric circles evenly spaced, the spacing between the centre of successive holes in a circle preferably being from 20 to 100 mm (most preferably about 50 mm). The separation between the centre of the holes and the centre of adjacent conduits in the same circle is preferably from 10 to 50 mm most preferably 22.5 mm. The separation of the distributor holes will be dictated by the placement of callandria.

Under washing conditions the distributor plate of the invention allows a significant increase in the throughput of wash solution enabling efficient cleaning of the plate itself and the other components of the evaporator (particularly the callandria) while at the same time providing efficient distribution under evaporative conditions.

It has been found that cleaning efficiency may be further improved where the distributor plate further comprises means for directing a portion of the washing liquid flowing through the overflow conduits onto the underside of the plate member. Preferably a plurality of overflow conduits are provided with nozzles disposed below the plate member and adapted to direct flow of wash liquid onto the underside of the plate member.

In a particularly preferred embodiment there is provided a distributor plate for a falling film evaporator and including an essentially planar plate member having a multiplicity of distribution holes therein the distributor plate being adapted to maintain a head of liquid thereon during evaporation and to regulate flow and distribution of liquid to be evaporated to callandria via distribution holes in the distributor plate and further including an array of overflow conduits for providing additional flow of liquid through the plate during washing the inlets of the overflow conduits being disposed above the surface of the plate member to provide an overflow of washing liquid during washing and wherein at least some of the overflow conduits extend below the distributor plate and include one or more appertures in the conduit wall below the plate member for providing a flow of wash liquid onto the underside of the plate member. The overflow conduits adapted to wash the underside of the plate will preferably have a closed bottom end to thereby force wash liquid through the appertures onto the underside of the plate member.

The build up of soil, which in the case of milk is referred to as milk stone, is a particular problem at the periphery of the plate member. This problem is exacerbated where the plate member abuts the housing of an evaporative effect thereby creating a corner in which build up is particularly difficult to remove. In a particularly preferred embodiment of the invention the distributor plate comprises a multiplicity of periphery cleaning overflow conduits being circumferentially spaced adjacent the periphery of the plate member and comprising means for directing wash liquid onto the underside of the plate and toward its peripheral edge. Where the distributor plate periphery abuts the housing of an evaporative effect the periphery cleaning overflow conduits provide effective cleaning of the corner formed by the abutment of the plate member and effect housing and also the inside of the housing wall.

In the design of many evaporators a space is left between the callandria to form a corridor between the periphery of the effect and the center of the bundle of evporative tubes. This corridor forms a dead space and the portion of the distributor plate directly above the corridor need not contain distributor holes. The underside of the distributor plate above the corridor in the bundle of tubes also tends to accumulate soil which can break free and cause contamination. It is therefore particularly preferred that the area of the distributor plate disposed above the corridor comprise one or more overflow conduits adapted to direct the flow of wash liquid on the underside of the plate member.

The distributor plate of the invention is particularly suited to use in falling-film evaporators and particularly in multiple effect evaporators.

In a further aspect the invention provides an evaporative effect including:
  a header chamber for receiving liquid to be concentrated;
  a bundle of evaporator tubes adapted to receive liquid from the header chamber the tubes (callandria) being adapted to provide evaporation of liquid from the inner surfaces thereof;
  a perforated distributor plate located in the header chamber to distribute liquid to the openings of the callandria; and
  a lower chamber for receiving liquid which has passed through the callandria,
wherein the distributor plate is in accordance with the first aspect of the invention.

In a preferred embodiment of this aspect of the invention the distributor plate includes a multiplicity of overflow conduits which are disposed for cleaning the callandria and provide downward flow of wash liquid. The callandria cleaning conduits are generally open ended and the bottom end may be adjacent or flush with the underside of the plate member or may extend into the callandria. The distributor plate will also comprise at least one overflow conduit adapted to clean the underside of the plate as hereinbefore described and most preferably will comprise a series of overflow conduits regularly spaced about the circumference of the plate for cleaning the underside of the plate at its periphery. The distributor plate will preferably comprise a pluarlity of overflow conduits spaced apart alone a radial line of the plate and adapted to clean the underside of the plate which may be positioned above a dead space formed by a corridor in the bundle of evaporator tubes.

The effects generally each have a housing with a cylindrical side wall and closed end walls. The cylindrical wall may be for example in the range of from 0.5 meters to 2 meters in diameter. Preferably the evaporator system includes at least three falling film type evaporation effects.

In a further aspect the invention provides an evaporation system which includes at least three falling film type evaporative effects. It is particularly preferred that the system is provided with means for providing parallel feed of wash liquid.

Preferably the evaporation system includes at least one wash liquid holding tank, a pump for transferring liquid from the tank and a branched wash liquid feed line to feed wash liquid to each of the evaporative effects in parallel.

The system is preferably adapted to feed wash liquid simultaneously into the header chamber of each effect from a single source of wash liquid.

It is particularly preferred that the system include a branched wash liquid feed line to provide parallel feeding of wash liquid to the header chambers of the effects and each effect comprises a wash liquid outlet line for transferring liquid from the lower chamber of the effects. The outlet lines may return wash liquid to the wash solution holding bank or may transfer it to a separate tank.

In one embodiment the system is provided with two or more wash liquid holding tanks each tank being in communication with the branched wash liquid feed line and provided with one or more values to control flow from the tank into the effects. Two or more tanks enable a number of wash liquids to be used for more effective cleaning. For example two or more of a caustic, acid, and rinse liquid tanks may be provided.

It has heretofore been the practice to clean evaporators by passing wash liquids through the series of effects under essentially the same conditions as used during evaporation. This can take up to 3 hours and requires that a vacuum be maintained and that steam be utilized to heat the callandria. We have found that by using the the distributor plate of the invention, rapid flow can be attained under ambient conditions and cleaning can be carried out at ambient pressure. Cleaning at ambient pressure using the distributor of the invention facilitates use of higher wash liquid temperatures and higher concentrations of cleaning agents which, together with increased flow rate, provide further significant increases in the efficiency of cleaning.

Cleaning was previously carried out using cleaning solutions such as aqueous caustic solution at a temperature of about 50° to 70° C. Generally the temperature in the first effect was about 50° C. and the temperature in the last effect was about 70°. The present invention allows temperatures of 85° to 112° to be used. By increasing the temperature by 40° and using aqueous caustic solution at about 95° to 98° C. a significant increase in cleaning efficiency is achieved. Furthermore higher temperatures have been found to allow a trebling in washing reagent strength.

The present invention also enables cleaning liquids to be more effectively utilized. Preferably the method of the invention comprises passing acid wash liquid and a caustic wash liquid through the effects. Preferably the effects are washed with acidic wash liquid before the caustic and preferably the effects are rinsed with water at the commencement and end of the washing sequence. The acid wash liquid is preferably an aqueous nitric acid solution, an aqueous phosphoric acid or a mix nitric and phosphoric acids. Preferably the acid wash liquid has a total acid concentration of from 1 to 5% w/v. The acid wash solution may be prepared by dilution of a concentrate which is preferably in the range of from 5 to 40% weight/volume (w/v) acid with from 10 to 30% w/volume acid preferred. The concentration of nitric acid used in preparing the acid wash liquid is preferably from 5 to 50% weight/volume of liquid. A mixture containing 10 to 30% phosphoric acid w/v and 20 to 50% nitric acid w/v is particularly preferred for preparation of the dilute acid wash liquid.

The caustic wash liquid may be selected from hydroxides of alkali and alkaline earth metals with sodium hydroxide and potassium hydroxide being most preferred. Aqueous potassium hydroxide is the most preferred caustic wash liquid. The concentration of sodium and/or potassium hydroxide is preferably in the range of from 1 to 20% w/w with from 3 to 10% w/w being preferred. The preferred reagent concentration will depend on the wash liquid temperature and flow velocity. At higher flow velocities the concentration of the wash liquid becomes less critical. At wash liquid temperatures in the range of from 85° to 95° C. caustic concentrations of from 2 to 4% w/w whereas at temperatures in the range of from 4 to 10% are more preferred. The dilute (1–5% w/v) acid wash liquid is preferably prepared from a concentrate of 17% w/v phosphoric acid and 45% nitric acid for use at 85° to 95° C. whereas a concentrate of 20% w/v phosphoric acid and 43% w/v nitric acid is most preferred at 95° to 112° C.

This enables a significant reduction in cleaning time thereby minimising the down-time of the evaporator. For example whereas cleaning of conventional evaporators generally takes at least 2.5 to 3 hours the present invention enables superior cleaning to be obtained in under one hour.

During evaporation product flow is either laminar or in the lower end of the turbulent range. The distributor plate of the invention allows small flows to be maintained during the evaporation process by using the appropriate size and distribution of distributor plate holes. Furthermore the distributor plate of the invention provides the significant advantage of allowing rapid flow of wash solution to the callandria to provide turbulent flow in the callandria during cleaning.

Accordingly the invention further provides a method of operating a multiple effect evaporator system each effect including:

a header chamber for receiving liquid to be concentrated,
a multiplicity of tubes (callandria) adapted to provide evaporation of liquid from a falling film on the inner surface thereof and
a perforated distributor plate located in the header chamber to distribute liquid to the openings of the callandria the distributor plate including an essentially planar plate having a multiplicity of distribution holes therein said planar plate restricting flow and providing distribution of liquid to be evaporated via said distribution holes to said multiplicity of tubes and further including a multiplicity of overflow conduits for providing a rapid flow of liquid through the plate during washing the inlet of the conduits being disposed above the surface of the plate; the process including: feeding the liquid to be evaporated into the effects in series said effects being retained under vacuum to facilitate evaporation; maintaining the level on said distributor plate of the liquid to he evaporated at less than the height of the inlets of the overflow conduits; returning the effects to ambient pressure; and feeding wash liquid into the header chamber of the effects at such a rate as to produce overflow of wash liquid into said overflow conduits.

The Reynolds number of the wash liquid in the tubes is preferably at least 2300, and more preferably in the range of 5500 to 7500.

It has been found that an increase in temperature and flow rate to provide turbulence in many cases results in an improvement in cleaning efficiency of over 300%. The present invention therefore enables evaporators to be cleaned significantly more efficiently than has previously been possible enabling a higher quality product to be maintained and reducing the time required for cleaning.

The evaporator of the invention has a significantly reduced incidence of blocked callandria. During operation of conventional evaporators build up of residues such as milk stone lead to blockage. The conventional cleaning method which involves passing cleaning liquid through the series of effects does not adequately remove such residues and indeed can result in the baking on of milk stone leading to blockages of callandria. Once callandria are blocked they can often only be cleaned by removing them from the effect and drilling out the blockage. As callandria are often 5 to 8 meters in length this process is extremely expensive both in labour and down time of the evaporator.

The distributor plate of the invention provides rapid flow during cleaning dramatically improving cleaning efficiency and avoiding blockages of distributor holes and callandria.

The running costs of the evaporator during cleaning are significantly reduced. The method of the invention in contrast to previous methods does not require that cleaning be carried under vacuum and does not require the use of steam to heat the callandria. A saving of at least 70% in steam usage during cleaning can therefore be made using the evaporator of the present invention.

The significant increase in cleaning efficiency provided by the present invention also allows washing waste to be minimized. Aqueous sodium hydroxide which is frequently used as a cleaning liquid poses a significant disposal problem as it is damaging to the environment. Potassium hydroxide provides much more efficient cleaning and is not as difficult to dispose of as sodium hydroxide. However it has generally not been utilized in washing evaporators as it is more costly than sodium hydroxide. The economies provided by the present invention enable small volumes of potassium hydroxide to be used in cleaning.

The method of the invention preferably includes operating a multiple effect evaporator system including feeding a liquid to be evaporated through a series of effects operating under vacuum to provide progressive concentration of the liquid, returning the system to ambient pressure and cleaning the system by feeding a wash liquid into the effects in parallel.

BRIEF DESCRIPTION OF THE DRAWINGS

The invention will now be described with reference to the exemplary embodiments shown in the attached drawings.

In the drawings:

FIG. 6 shows the plan view of a distributor plate of the invention.

FIG. 6c is a cross-section along the line A–A' of FIG. 6b and shows the arrangement of apertures in the wall of the overflow conduit.

FIG. 6e is a cross-section of the overflow conduit shown in FIG. 6d along the line A–A'.

DETAILED DESCRIPTION

Figure 1:
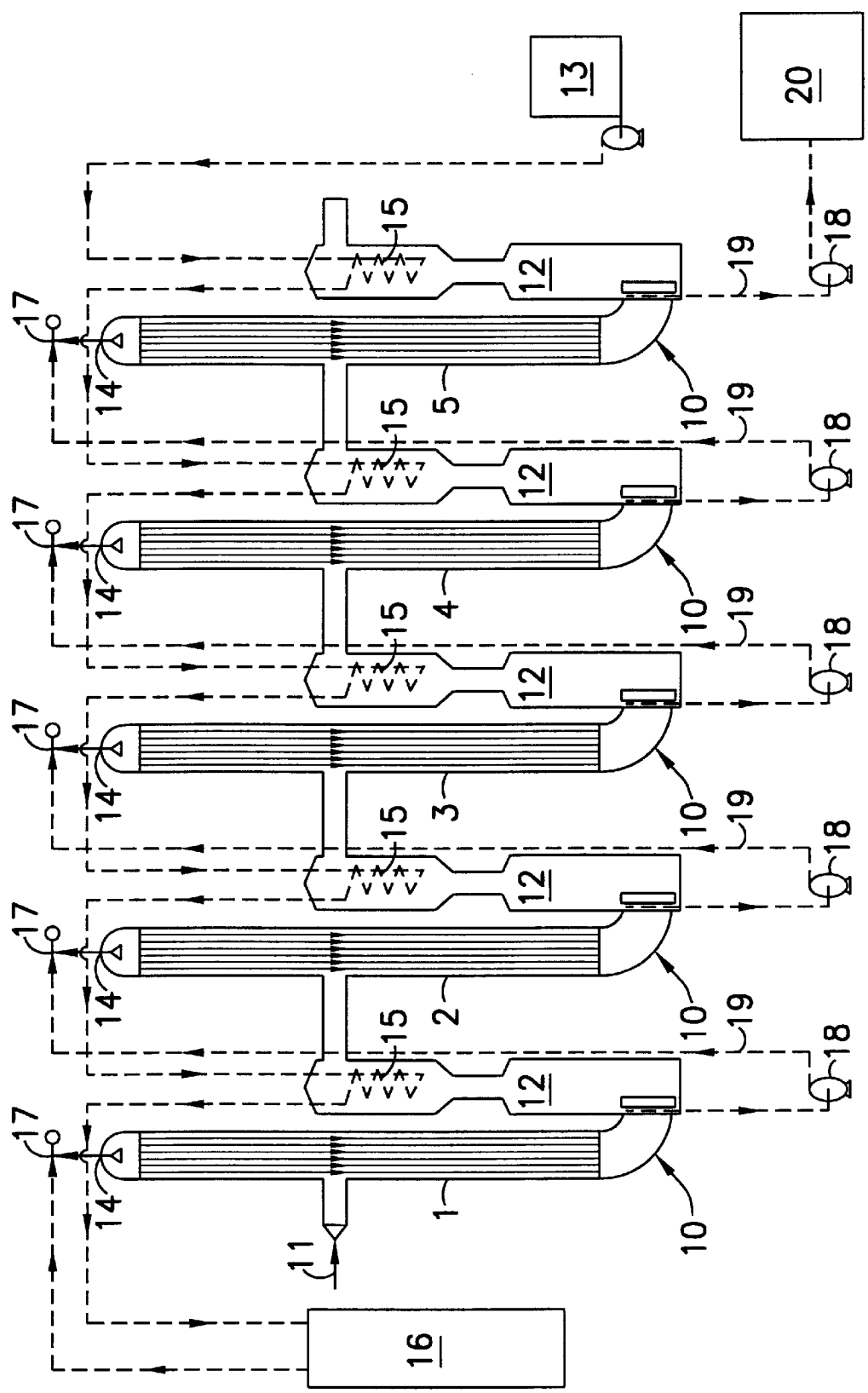
FIG. 1 is a schematic plant of a multiple effect evaporator.
Figure 2:
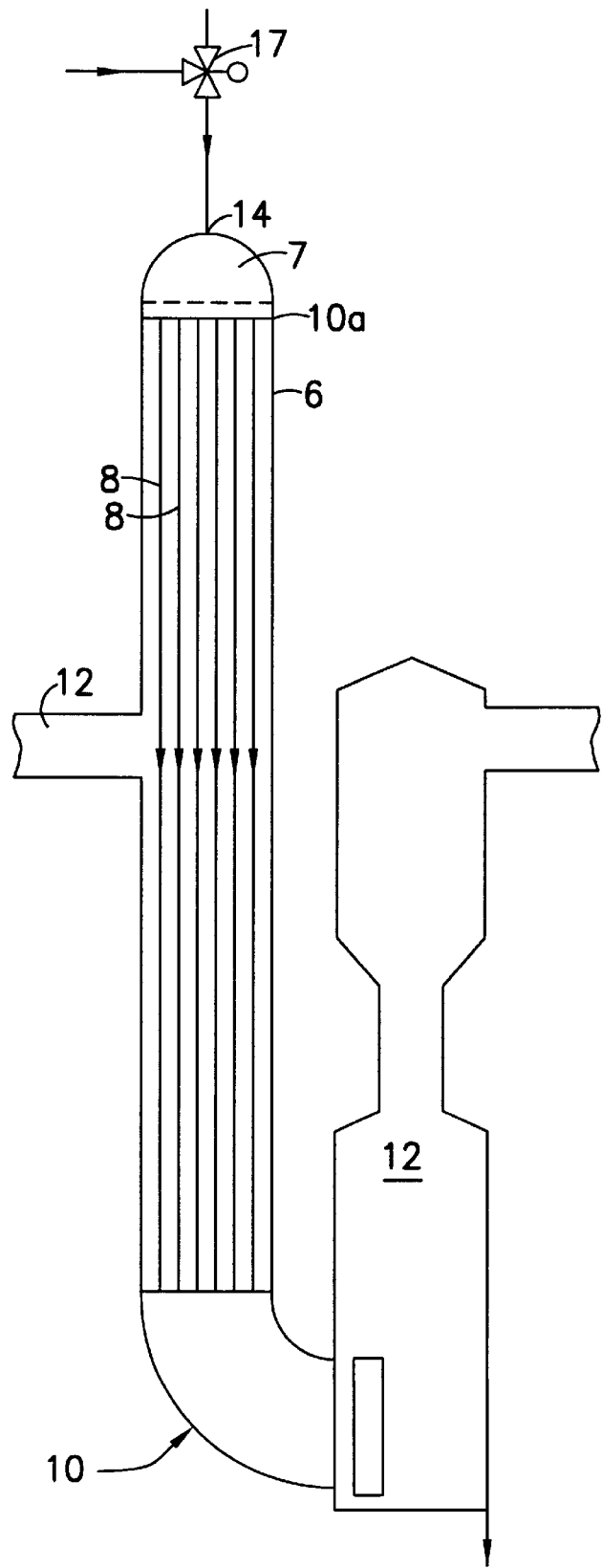
FIG. 2 is a schematic plan of an enlarged view of an effect.

Referring to FIGS. 1 and 2 there is shown an evaporator system comprising five evaporative effects (1–5) in series. As shown in FIG. 2 the evaporative effects each comprise housing (6) header chamber (7) for receiving liquid to be concentrated a multiplicity of tubes (callandria) (8) to provide evaporation from a falling film on the inner surfaces thereof, a perforated distributor plate (9) located in the header chamber (7) to distribute liquid to the openings of the callandria (8) and a lower chamber (10) for receiving liquid which has passed through the callandria (8). The callandria are typically supported by a mounting plate (10a) so that the tubes (8) provide a falling film beneath the mounting plate (10a) and have their upper openings flush with the upper surface of the mounting plate (10a).

As shown in FIG. 1 a steam inlet (11) is provided in the first effect (1) to heat the external surfaces of the callandria (8) and vapour ducts (12) are provided from the lower chamber of the effects to allow steam to be transferred to heat the callandria of the next effect in the series.

A product storage tank (13) stores the liquid to be evaporated which is preheated by being passed to the inlet (14) of the first effect (1) via heat transfer means (15) in the vapour ducts (12) of effects (1–5). A temporary holding tank (16) may be provided to hold the preheated liquid before evaporation. During the evaporation procedure the evaporator system is operated under vacuum and steam is fed into the first effect (1) and is fed to subsequent effects via vapour ducts (12). The product to be evaporated is fed to the first effect (1) via inlet valve (17) and onto the distributor plate (9) and into the heated callandria (8) where evaporation occurs under vacuum from a falling film of the product. The product after being concentrated in the callandria falls into the lower chamber (10) where it is transferred via pump (18) through product transfer conduit (19) to the inlet valve (17) of the next effect (2).

From the lower chamber of the last effect (5) in the series (often referred to as finisher effect) product is transferred via the respective product outlet pump (18) for further processing. For example, where powdered concentrate is to be produced the pump may transfer product to a predryer (20) from which it is dried to form a powder.

Figure 3:
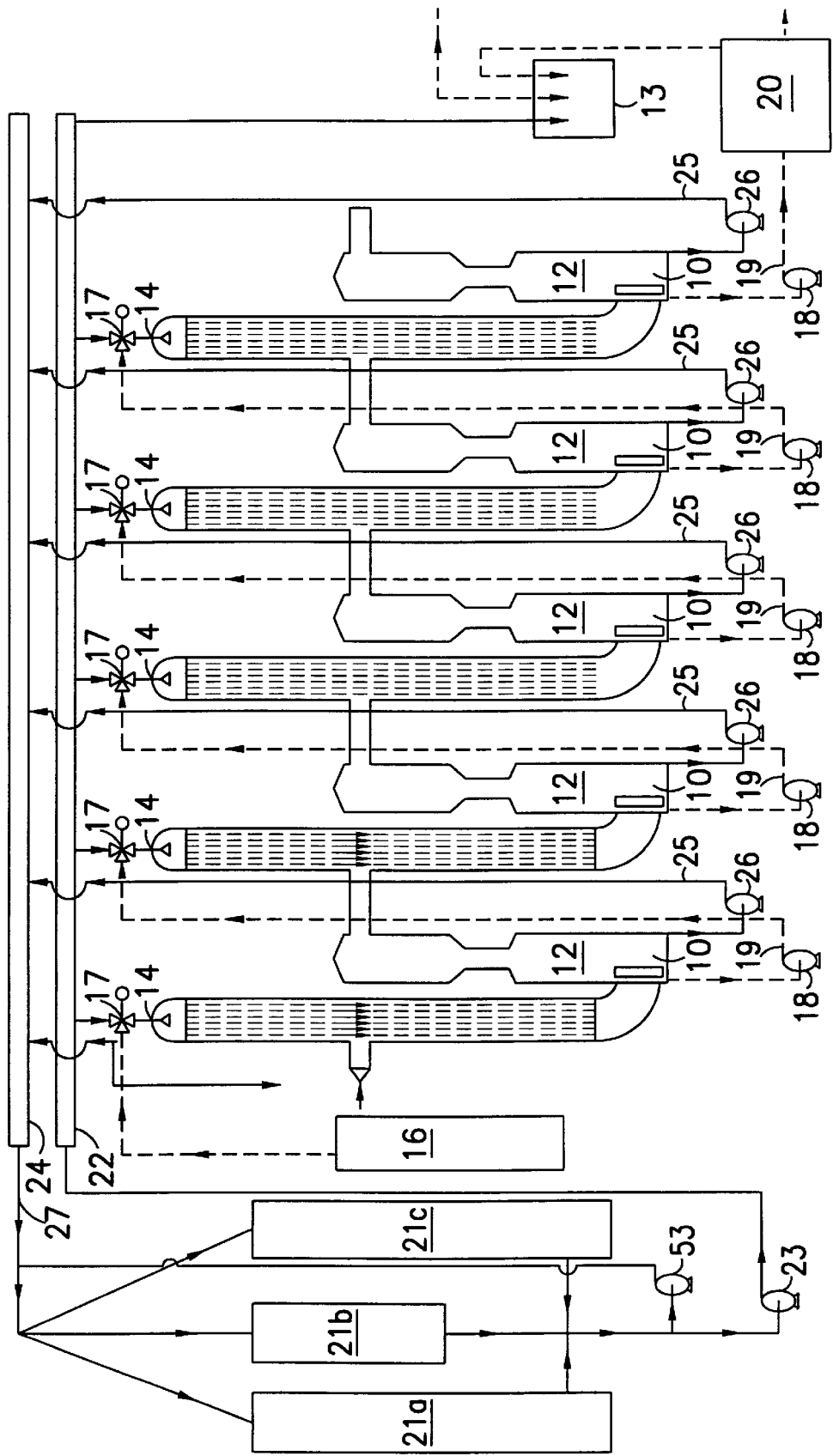
FIG. 3 is a schematic plant of an evaporator system in accordance with the invention.

Referring to FIG. 3 there is shown an evaporator system in accordance with the invention comprising the evaporator as hereinabove described (the product preheater has been omitted for clarity). The evaporator includes a washing system including at least one wash liquid holding tank (21) and preferably three such tanks as shown (21a), (21b) and (21c). A wash liquid inlet manifold (22) for feeding wash liquid to the effects in parallel and a wash liquid inlet pump (23) for transferring wash liquid to the inlet manifold under pressure. The wash liquid inlet manifold may be brought into communication with the inlet (14) of each effect and via three way valves (17). The three way valves (17) allow the effects to be in line with the product transfer conduits (19) during evaporation and to be in line with the wash inlet manifold (22) during the washing cycle. A wash liquid recycle manifold (24) is in communication with the lower chamber (10) of each effect (1–5) via wash liquid recycle conduit (25) which is provided with wash liquid outlet pump (26). The wash liquid recycle manifold (24) is adapted to transfer wash liquid to the holding tanks (21) via return line (27).

Figure 4:
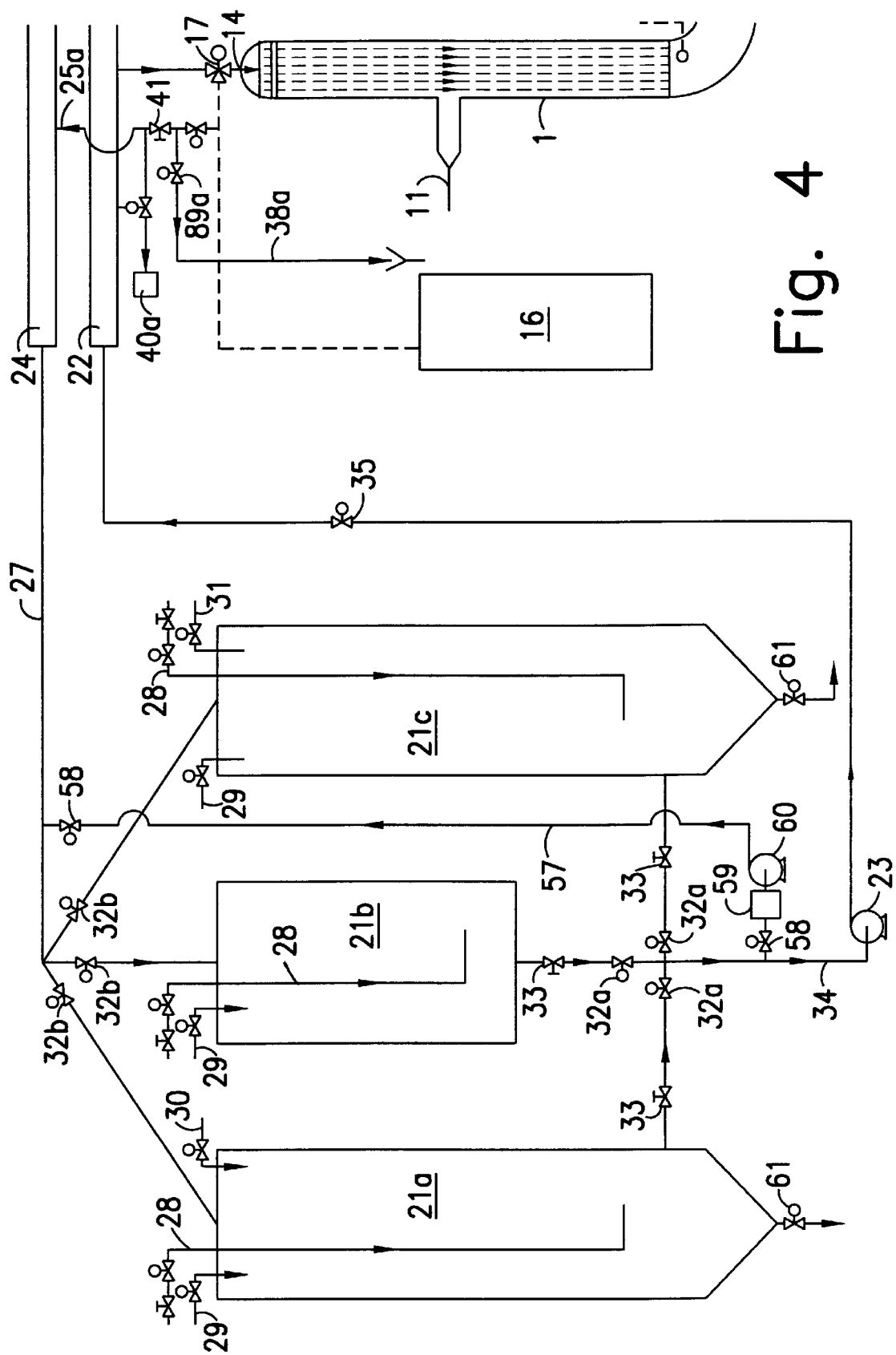
FIG. 4 is a schematic plant showing an enlargement of the first portion of the evaporator system of FIG. 3.
Figure 5:
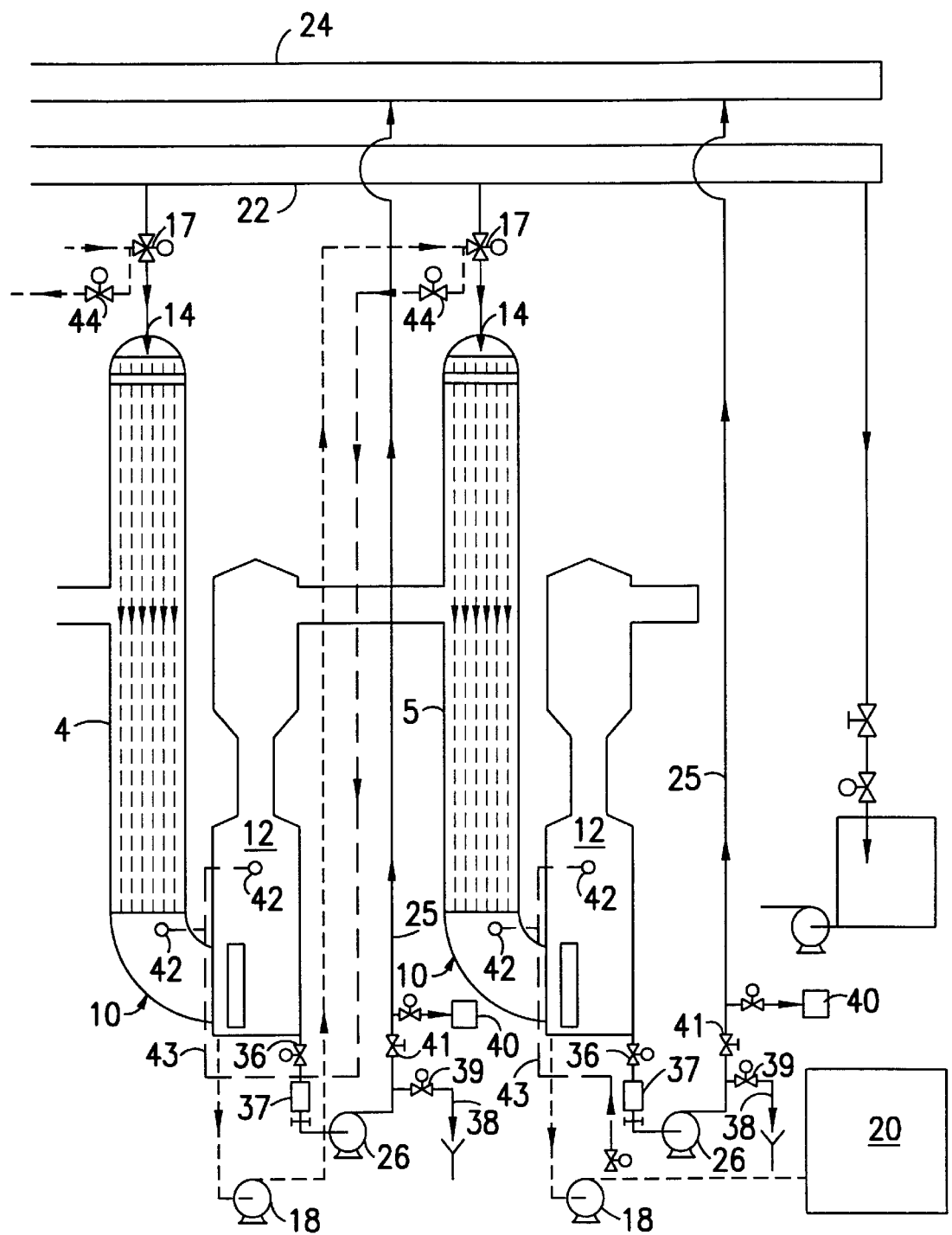
FIG. 5 is a schematic plant showing an enlargement of the final portion of the evaporator system of FIG. 3.

Referring to FIGS. 4 and 5 the wash liquid tanks are preferably provided with steam sparge lines (28) and water inlet lines (29). The wash liquid tanks preferably include a caustic holding tank (21a) provided with inlet (30) for concentrated caustic and an acid wash holding tank (21c) with an inlet (31) for concentrated acid. The outlet of each wash liquid holding tank (21) is preferably provided with automated valves (32a) and manual valves (33) which allow transfer to a common inlet manifold feed line (34) provided with the outlet feed pump (23) and automated valve (35).

Preferably the bottom of each of the caustic holding tank (21a) and the acid wash holding tank (21c) is conical (as shown in FIG. 4) narrowingly tapering to an outlet adjacent the centre. The bottom outlet of the caustic tank (21c) and acid washtank (21c) are preferably provided each with outlet valve (61) to allow removal of sludge derived from washing of the effects. Solid contaminants cleaned from the effects during washing are allowed to settle in the tanks and are removed periodically as a sludge via outlet valves (61).

As shown in FIG. 5 the lower chamber of each effect is provided with an automatic valve (36) to control passage of liquid into the wash liquid recycle conduit (25) and a flow meter (37) to enable determination of when liquid flow through the effects is complete. The wash liquid recycle conduit (25) is also provided with a waste line (38) having an automated waste line valve (39) to allow heavily contaminated washing liquid to be disposed of. A turbidity analyser (40) is also provided to measure turbidity of the wash liquid downstream of the waste line (38). The turbidity analyser (40) enables measurement of the level of contaminants in the wash liquid which has passed through respective effects (1–5) and provides a basis or determining whether water is to be recycled via wash liquid recycle manifold (24) or disposed of via waste line (38). A manually operated valve (41) is preferably provided in wash liquid recycle conduit between waste line (38) and turbidity analyser (40). The effect inlet valve (17) of the first effect (1) is preferably adapted to allow wash liquid to be fed to the temporary product holding tank (16) which is preferably provided with a recycle line (25a) to the wash liquid recycle manifold (24) having automated valve (39a), waste line (38a) and turbidity analyser (40a).

It is particularly preferred that the vapour ducts (12) and lower chamber (10) are provided with wash liquid spray means (42). An example of such a spray means is known in the industry as a "sprayball". Wash liquid is preferably fed to the spray means (42) via spray means fed line (43) from effect inlet valve (17). The spray means fed line (43) may include automatic valve (44) to control wash liquid flow to the spray means (42).

Wash liquid fed to the recycle manifold (24) is returned to the respective wash liquid holding tank (21) via return valve (32b).

To enable the outlet manifold and inlet manifold feed line (34) to be emptied of wash liquid after washing it is preferred to use an inlet manifold recycle line (57) to provide a flow of wash liquid from the inlet manifold feed line to the return line (27).

Inlet manifold recycle line (57) is preferably provided with two valves (58) and a flow meter (59) and pump (60) each disposed between the valves (58).

To facilitate rapid flow of wash liquid through the effects the invention provides an improved distributor plate.

Figure 6A:
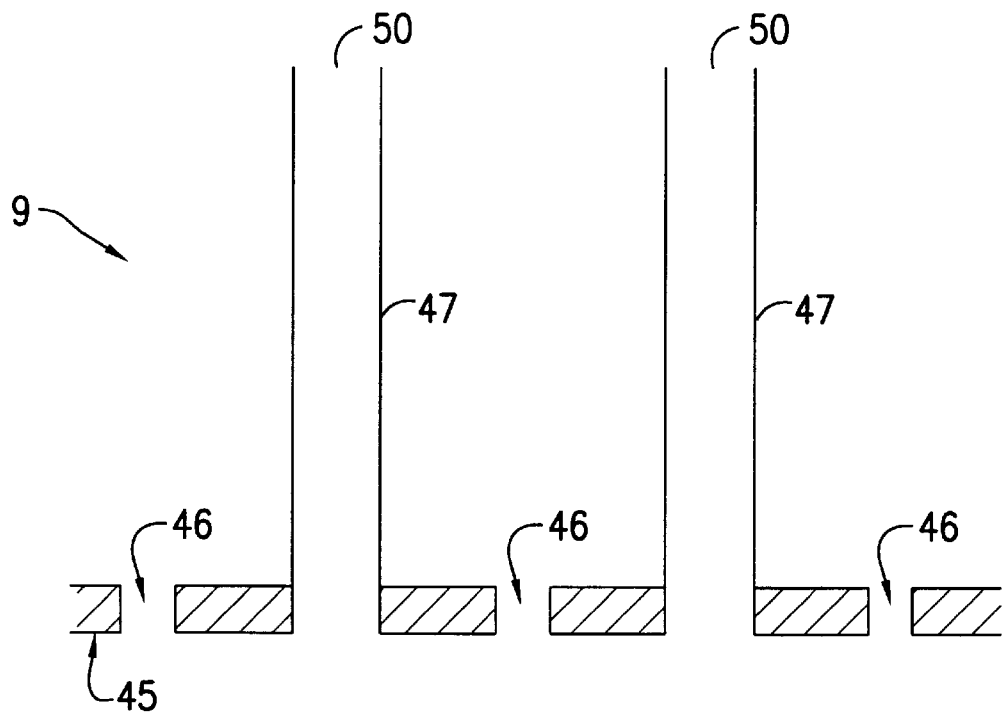
FIG. 6a shows a part cross-section of the distributor plate of the invention along the line A–A' of FIG. 6 and showing distributor holes and overflow conduit.
Figure 6D:
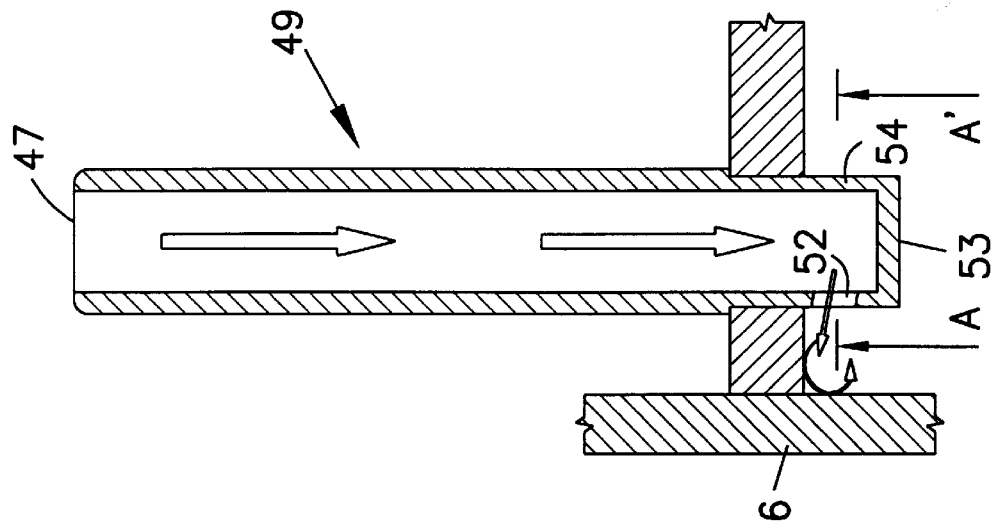
FIG. 6d is a longitudinal cross-section through an overflow conduit located at the periphery of the plate.
Figure 6B:
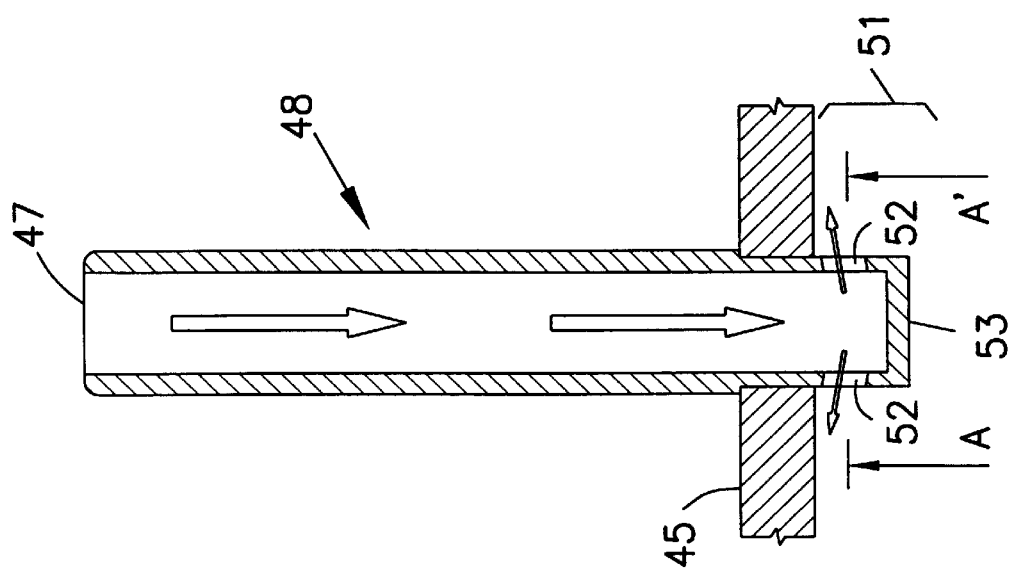
FIG. 6b is a longitudinal cross-section of an overflow conduit for cleaning the underside of the plate.

Referring to FIG. 6 and FIGS. 6a to 6e the distributor plate (9) comprises an essentially planar plate member (45) which is perforated comprising a multiplicity of product transfer or distribution holes (46) which are preferably in the range of from 2–15 millimeters diameter (most preferably 7 millimeters). The distribution holes may form a series of rows spaced across the plate. Preferably the distribution holes are arranged in a pluarlity of concentric circles as shown in FIG. 6. The plate may be constructed of any suitable material however where the liquid to be evaporated is milk stainless steel is particularly preferred. The suitable thickness of the plate will depend on the rigidity of the material however from 1 to 20 mm is preferred.

The distributor plate further comprises a multiplicity of overflow conduits (47) in the form of tubes each essentially perpendicular to the plate and arranged in a plurality of concentric circles, a distribution hole being located between successive overflow conduits within a circle. The inlet (50) of the overflow conduits is above the surface of the plate member (45). The inlet (50) of the conduits is preferably disposed at least 10 millimeters, more preferably in the range of from 20–100 millimeters, above the surface of the plate (45). The height of the inlet (50) of the overflow conduits above the upper surface of the plate is preferably in the range of from 1–20 times the diameter of the distribution holes (46). The diameter of the overflow conduit (47,48,49) is preferably greater than the diameter of the distribution holes (46) and most preferably from 1.5 to 3 times the diameter of the distribution holes.

Two distinct types of overflow conduits are shown and are distinguished by their washing function. The majority of overflow conduits are callandria-cleaning overflow conduits (47) which direct the overflow of wash liquid downward into a callandria (8). Distribution holes (46) are preferably located between adjacent callandria cleaning overflow conduits (47) as shown in FIG. 6.

The callandria cleaning overflow conduits (47) are open ended, the lower end of the conduit being flush with the underside of the plate member (45). The distributor plate (9) comprises a multiplicity of plate-cleaning overflow conduits (48,49) comprising means for directing the flow of washing liquid onto the underside of the plate member (45). The plate-cleaning overflow conduits (48,49) project below the plate member (10) to form nozzles (51) which comprise apertures (52) for directing the flow of wash liquid onto the underside of the plate member (45) and are closed at the bottom end (53). A multiplicity of apertures (52) circumferentially spaced in the wall (54) of the conduit (48,49) below the plate member (45). It is particularly preferred that the apertures (52) pass through the wall (54) of the nozzle (51) of overflow conduit (48,49) at an angle inclined upward in the direction of flow. It has been found that an angle of in the range of 8°–25° from the horizontal is preferred and an angle of from 10°–15° inclined from the horizontal is most preferred. The spacing of the apertures (52) from the underside of the plate member (45) will depend to a certain extent on the size of the apertures (52) as well as the pressure created during washing by the head of wash liquid above the distributor plate (9). Typically the apertures (52) will be within 10 mm of the underside of the plate and more preferably within 5 mm. The distributor plate comprises a multiplicity of overflow conduits (48,49) adapted to clean the underside of the plate preferably include a multiplicity of periphery cleaning conduits (49) spaced about the periphery of the plate (9) and which include a plurality of apertures (52) directed outward toward the effect housing (6). The peripheral conduits (49) preferably direct wash liquid into the corner (6a) formed by the abutment of the plate member (45) and the effect housing (6). It has generally been found convenient to space the apertures (52) in the conduit wall such that the angle between apertures is from 45°–70° with 60° being particularly preferred.

Figure 7:
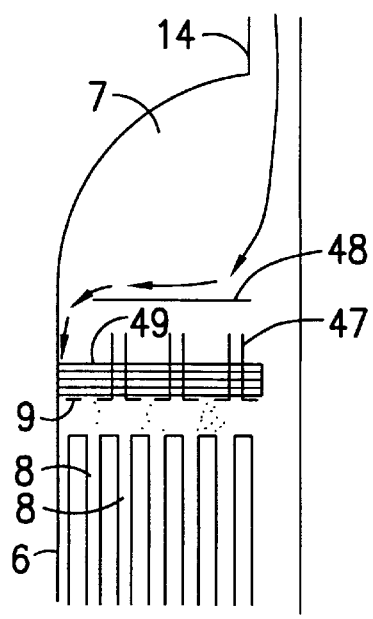
FIG. 7 is a longitudinal section of the left half of the upper part of an evaporative effect comprising a distributor plate of the invention under evaporative conditions.

The operation of the distributor plate will now be described with reference to FIGS. 7 and 8.

The header chamber of each effect is preferably provided with an inlet flow deflector (55) to deflect flow of liquid to the periphery of the effect (that is, adjacent the wall of the effect). The deflector is preferably in the form of a plate disposed in the header chamber at right angles to the axis of the effect between the inlet (14) and distributor plate (9).

Liquid flowing from the inlet of the effect is deflected by the deflector (55) toward the wall of the effect and flows onto the distributor plate at its periphery.

The edges of the distributor plate (9) preferably abut the inner side of the housing (6) of the evaporator. During evaporation under vacuum the distributor plate (9) operates as shown in FIG. 7. The liquid to be evaporated flows over the surface of the deflecter plate and is preferably introduced at a rate suitable to maintain a head of product liquid (56) in the range of from 10–50 millimeters above the surface of the distributor plate (9) (most preferably 20 millimeters). The height of the overflow conduits (47,48,49), the diameter of the distributor holes (46), the surface area of the plate (45) and the rate of product flow are selected such that the level of product on the distributor plate is below the inlet of the overflow conduits (47,48,49). The overflow conduits (47, 48,49) are preferably located between adjacent distributor holes (46) so that the overflow is evenly distributed beneath the plate during washing.

During washing washing liquid is introduced to the header chamber at such a rate as to provide overflow into the overflow conduits (47,48,49) and thereby provide rapid flow of wash liquid to the callandria (8) via callandria cleaning overflow conduits (47) and rapid flow onto the underside of the plate member (45) via periphery cleaning overflow conduits (49) and plate cleaning overflow conduits (48).

The evaporator is preferably washed out periodically by introducing a wash solution at a rate such that overflow of the wash solution into the overflow conduits occurs. The flow of wash solution is preferably selected to give a falling film velocity of at least 1 m per second.

Figure 8:
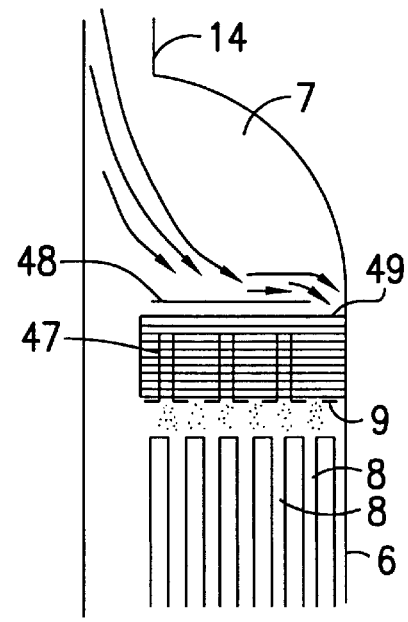
FIG. 8 is a longitudinal section of the right half of the upper part of an evaporative effect comprising a distributor plate of the invention under washing conditions.

Operation of the distributor plate during washing under ambient pressure is shown in FIG. 8. Rapid flow of wash liquid from the effect inlet (14) causes a head of liquid (56) to be maintained on the distributor plate which is at least as high and preferably higher than the inlet (50) of the overflow conduits thereby providing flow of wash liquid to the callandria (8) via overflow conduits (47,48,49).

During evaporation the effect inlet valves (17) provide communication between temporary product holding tank (16) and first effect (1) and all subsequent effects (2–5) in series via product transfer conduits (19). Effect inlet valves (17) are closed to wash liquid inlet manifold (27) and the wash liquid automated outlet values (26) are closed and spray means feed line valve (44) is closed. The system is maintained under a vacuum and steam is fed into steam inlet (11). After being heated by heat transfer means (15) product is delivered to temporary product holding tank (16) from which it is fed to the first effect (1) and then is pumped through product transfer conduit (19) via pump (18) through the next effect (2). This procedure is repeated until product has passed through the last effect in the series. The product may then be predryed in the predryer (20) and subsequently processed into powder, During evaporation, particularly in the case of milk, residue builds up in the callandria (8) lower chamber (10) and vapour ducts (12), distributor plate (9) and header chamber (7).

To commence cleaning the product line is closed, the system is returned to ambient pressure and steam inlet (11) is shut off. The wash liquid outlet valve (36) in the lower chamber (10) of each effect (1–5) is opened and the waste line valves (39) are opened. The wash liquid outlet pumps are operated until flow meters (37) show zero flow indicating that remaining product has been pumped from the system.

The wash liquids, contained in respective tanks (21), are heated to a temperature in the range of 85° to 100° C. by steam from sparge lines (28). The most preferred caustic wash liquids are aqueous sodium hydroxide and aqueous potassium hydroxide. Concentrations of 3 to 4% by weight of sodium hydroxide or potassium hydroxide are particularly effective. The preferred acid wash liquid is aqueous nitric acid most preferably of concentration of about 1% by weight. The wash liquid tanks (21) are preferably jacketed to reduce heat loss. To commence cleaning the appropriate tank outlet valve (32a) and the appropriate tank return valve (32b) is opened. Effect inlet valves (17) and inlet manifold feed line valves (35) are opened. Wash liquid inlet pump (23) is activated and spray means feed line valve (44) are also opened to provide efficient cleaning of lower chamber (10) and vapour ducts (12). Effect product outlet pump (18) is activated to ensure thorough cleaning of all lines. As a result wash liquid is simultaneously pumped into the header chamber of each effect in parallel and is distributed to callandria via the distributor plate as described above with respect to FIG. 8.

To empty the inlet manifold (22) and inlet manifold feed line (34) the inlet manifold feed line (34) is brought into communication with return line (27) by opening valves (58) of the manifold recycle line (57). The pump in the manifold recycle line (60) is activated to return liquid from the inlet manifold (22) and inlet manifold and feed line (34) to the appropriate storage tank (21) via return line (27).

The pump (60) is stopped when flow meter (59) indicates zero flow and valves (57) are closed. Drain line valves (39) are then opened to purge remaining wash liquid from the system. When flow meters (37) indicate zero flow or wash liquid tank liquid level is too low pump (23) will stop and valves (23) will shut.

The flow meters (37) are preferably provided with blockage indication means and the flow meters (37) preferably determine the rate of flow of the wash liquid which has passed through the callandria and compares the rate with predetermined flow rate for clean effects under equivalent conditions and wherein the blockage indication means indicates a blockage when the flow rate is below the predetermined level. In a preferred embodiment flow meter is adapted to measure the time taken for the wash liquid to drain from the system.

The cleaning reaction between caustic wash liquid and the residue on the inside of the effects can be monitored by measuring turbidity using turbidity analyser (40) which is preferably an infra-red turbidity analyser. Monitoring of turbidity allows the time of completion of the cleaning reaction between caustic and contaminant such as milk stone to be determined to optimize cleaning efficiency and minimize down time.

The flow rate to achieve a Reynolds number of 2300 will depend on the temperature of the liquid and diameter of the callandria. Tables 1, 2 and 3 below show variation in the Reynolds number for tubes of 35, 40 and 50 mm diameter respectively. Each table shows the effect of flow rate, film thickness and temperature on Reynolds Number.

It is particularly preferred that the flow rate of wash liquid is greater than 1 meter per second and temperature is from 85° C. to 100° C.

Although a specific example of the invention has been described in detail in the foregoing for the purposes of illustration it is to be understood that such detail is solely for that purpose and that variations can be made therein by those skilled in the art without departing from the spirit and scope of the invention.

TABLE I

VARIATION OF REYNOLDS NO. WITH TEMPERATURE AND FLOW RATE (Tube Diameter 35 mm)

| Flow | 50° C. | | | 70° C. | | | 95° C. | | |
|---|---|---|---|---|---|---|---|---|---|
| l/min | Re | m/s | t mm | Re | m/s | t mm | Re | m/s | t mm |
| 0.7 | 723 | 0.397 | 0.27 | 988 | 0.441 | 0.24 | 1458 | 0.502 | 0.21 |
| 1.4 | 1446 | 0.631 | 0.34 | 1976 | 0.700 | 0.30 | 2916 | 0.797 | 0.27 |
| 2.1 | 2169 | 0.826 | 0.39 | 2964 | 0.917 | 0.35 | 4374 | 1.044 | 0.30 |
| 2.8 | 2892 | 1.001 | 0.42 | 3952 | 1.111 | 0.38 | 5832 | 1.265 | 0.34 |
| 3.5 | 3615 | 1.162 | 0.46 | 4940 | 1.289 | 0.41 | 7290 | 1.468 | 0.36 |
| 4.2 | 4338 | 1.312 | 0.49 | 5928 | 1.456 | 0.44 | 8748 | 1.657 | 0.38 |
| 5.5 | 5681 | 1.570 | 0.53 | 7763 | 1.743 | 0.48 | 11456 | 1.984 | 0.42 |
| 6.2 | 6404 | 1.701 | 0.55 | 8751 | 1.887 | 0.50 | 12914 | 2.149 | 0.44 |
| 6.9 | 7127 | 1.826 | 0.57 | 9739 | 2.027 | 0.52 | 14312 | 2.308 | 0.45 | m/s = meters per sec.
t = film thickness
Transition laminar to turbulent flow occurs at Re >1200
Note: Increasing temperature 50° C. to 95° C. increases turbulence 100 percent. Reaction rates also increased. Increasing temperature 70° C. to 95° C. increases turbulence 33 percent. Increasing flow 3 times increases turbulence 300 percent.

TABLE 2

VARIATION OF REYNOLDS NO. WITH TEMPERATURE AND FLOW RATE
(Tube Diameter 40 mm)
Reynolds No. Velocity and Film Thickness at 50° C., 70° C. & 95° C.

| Flow | 50° C. | | | 70° C. | | | 95° C. | | |
|---|---|---|---|---|---|---|---|---|---|
| l/min | Re | m/s | 1 mm | Re | m/s | 1 mm | Re | m/s | 1 mm |
| 0.7 | 633 | 0.363 | 0.26 | 865 | 0.403 | 0.20 | 1276 | 0.459 | 0.20 |
| 1.4 | 1265 | 0.577 | 0.32 | 1729 | 0.640 | 0.29 | 2552 | 0.729 | 0.25 |

TABLE 2-continued

VARIATION OF REYNOLDS NO. WITH TEMPERATURE
AND FLOW RATE
(Tube Diameter 40 mm)
Reynolds No. Velocity and Film Thickness at 50° C., 70° C. & 95° C.

| Flow | 50° C. | | | 70° C. | | | 95° C. | | |
|---|---|---|---|---|---|---|---|---|---|
| l/min | Re | m/s | 1 mm | Re | m/s | 1 mm | Re | m/s | 1 mm |
| 2.1 | 1898 | 0.756 | 0.37 | 2594 | 0.839 | 0.33 | 3827 | 0.955 | 0.29 |
| 2.8 | 2530 | 0.916 | 0.41 | 3458 | 1.016 | 0.37 | 5103 | 1.157 | 0.32 |
| 3.5 | 3163 | 1.063 | 0.44 | 4324 | 1.179 | 0.39 | 6379 | 1.343 | 0.35 |
| 4.2 | 3796 | 1.200 | 0.46 | 5187 | 1.333 | 0.42 | 7655 | 1.516 | 0.37 |
| 5.5 | 4971 | 1.436 | 0.51 | 6793 | 1.594 | 0.46 | 10024 | 1.815 | 0.40 |

TABLE 3

VARIATION OF REYNOLDS NO. WITH TEMPERATURE
AND FLOW RATE
(Tube Diameter 50 mm)

| 0.7 | 506 | 0.313 | 0.24 | 692 | 0.348 | 0.21 | 1021 | 0.396 | 0.19 |
|---|---|---|---|---|---|---|---|---|---|
| 1.4 | 1012 | 0.497 | 0.30 | 1383 | 0.552 | 0.27 | 2041 | 0.628 | 0.24 |
| 2.1 | 1518 | 0.652 | 0.34 | 2075 | 0.723 | 0.31 | 3062 | 0.823 | 0.27 |
| 2.8 | 2024 | 0.789 | 0.38 | 2707 | 0.876 | 0.34 | 4082 | 0.997 | 0.30 |
| 3.5 | 2530 | 0.916 | 0.41 | 3458 | 1.016 | 0.37 | 5103 | 1.157 | 0.32 |
| 4.2 | 3037 | 1.034 | 0.43 | 4150 | 1.148 | 0.39 | 6124 | 1.307 | 0.34 |
| 5.5 | 3976 | 1.238 | 0.47 | 5434 | 1.374 | 0.42 | 8019 | 1.564 | 0.37 |
| 6.2 | 4483 | 1.341 | 0.49 | 6126 | 1.488 | 0.44 | 9040 | 1.694 | 0.39 |
| 6.9 | 4989 | 1.444 | 0.51 | 6818 | 1.598 | 0.46 | 10060 | 1.819 | 0.40 |

What is claimed is:

1. An evaporator system including a plurality of effects arranged in series for progressively concentrating a liquid, each of said effects including: a header chamber for receiving liquid to be concentrated; a multiplicity of tubes constituting a callandria adapted to provide evaporation of liquid from inner surfaces of the tubes and a perforated distributor plate located in the header chamber to distribute liquid to openings of the tubes; and wherein the evaporator system is provided with a branched wash liquid feed for feeding of wash liquid to the header chambers of the effects onto respective distributor plates during a washing operation, the distributor plates each comprising an essentially planar plate member having a multiplicity of distributor holes therein for distributing the liquid to be evaported to said multiplicity of tubes and a series of overflow conduits for providing a flow of wash liquid through the plate, said overflow conduits extending upwardly from said distributor plate and having inlets disposed at a height above an upper surface of the plate which is greater than a level of said liquid to be concentrated during evaporation and enabling rapid flow of wash liquid into said chamber and through the conduits during washing.

2. An evaporator system according to claim 1, wherein the header chamber of each of said effects has an inlet and a product line connected to said inlet for supplying the liquid to be concentrated into said header chamber, said branched wash liquid feed line being branched from said inlet line for providing parallel feeding of wash liquid to the header chamber.

3. An evaporator system according to claim 1 wherein the series of overflow conduits include a plurality of said overflow conduits which are provided with nozzles disposed below the plate member and adapted to direct flow of wash liquid onto an underside of the plate member.

4. An evaporator system according to claim 1 wherein the series of overflow conduits include a plurality of overflow conduits in which the conduits extend below the plate member and include at least one aperture in a wall thereof beneath the plate member and wherein a lower end of the overflow conduit is closed to provide a flow of wash liquid through the aperture(s) onto an underside of the plate.

5. An evaporator system according to claim 1 wherein the series of overflow conduits includes a multiplicity of callandria-cleaning overflow conduits being open ended and adapted to provide a direct flow to the callandria; at least one plate cleaning overflow conduit being adapted to clean an underside of the distributor plate said plate cleaning overflow conduit extending below the plate member and including a closed lower end and having a plurality of circumferentially spaced apertures in a wall of the conduit below the plate member.

6. An evaporator system according to claim 5 wherein said at least one plate cleaning overflow conduit includes at least one inner overflow conduit adapted to clean a central part of the underside of the plate and a series of periphery cleaning overflow conduits spaced about a circumference of the plate member and including a plurality of apertures for directing wash liquid outward onto the underside of the plate adjacent its peripheral edge.

7. An evaporator system according to claim 5 wherein said apertures are inclined upward in the direction of flow at an angle in the range of from 10° to 15° from the horizontal and within 5 mm of the underside of the plate member.

8. A method of operating an evaporator system having a plurality of effects, each of said effects including:
 a header chamber for receiving liquid to be concentrated by evaporation;
 a callandria adapted to provide evaporation of liquid from a falling film in inner surfaces of the callandria; and
 a distributor plate located in the header chamber to distribute liquid to openings of the callandria via distribution holes in the distributor plate, said distributor plate including an essential planar plate member perforated with said distribution holes and further including a series of overflow conduits for providing a rapid flow of a washing liquid through the plate during washing, the conduits having inlets disposed above the surface of the planar plate, said method including: feeding the liquid to be evaporated into the effects in series, said effects being retained under vacuum to facilitate evaporation; maintaining a level on said distributor plates of the liquid to be evaporated at less than the height of inlets of the overflow conduits above the respective plates; returning the effects to ambient pressure; and providing parallel feeding of wash liquid into the header chambers of the effects and onto respective distributor plates at such a rate as to produce overflow of wash liquid into the inlets of the overflow conduits.

9. A method according to claim 8 wherein the temperature of the wash liquid is in the range of from 85° to 112° C.

10. A method according to claim 8 wherein the wash liquid flow has a Reynolds Number of at least 2300 in said callandria.

11. A method according to claim 10 wherein the Reynolds number if from 5500 to 7500.

12. A method according to claim 8 wherein potassium hydroxide of concentration of 3 to 10 percent by weight is passed through the effects and the effects are rinsed with water.

13. A method according to claim 8 wherein the series of overflow conduits include a plurality of overflow conduits which are provided with nozzles disposed below the plate member and adapted to direct flow of wash liquid onto the underside of the plate member.

14. A method according to claim 8 wherein the series of overflow conduits include a plurality of overflow conduits in which the conduits extend below the plate member and include at least one aperture in a wall thereof beneath the plate member and wherein the lower end of the overflow conduit is closed to provide a flow of wash liquid through the aperture(s) onto an underside of the plate.

15. A method according to claim 8 wherein the series of overflow conduits includes a multiplicity of callandria-cleaning overflow conduits being open ended and adapted to provide a direct flow to the callandria; at least one plate cleaning overflow conduit being adapted to clean an underside of the distributor plate, said plate cleaning overflow conduits each extending below the plate member and including a closed lower end and having a plurality of circumferentially spaced apertures in a wall of the conduit below the plate member.

16. A method according to claim 15 wherein said at least one plate cleaning overflow conduit includes at least one inner overflow conduit adapted to clean a central part of an underside of the plate and a series of periphery cleaning overflow conduits spaced about a circumference of the plate member and including a plurality of apertures for directing wash liquid outward onto the underside of the plate adjacent its peripheral edge.

17. A method according to claim 15 wherein said apertures are inclined upward in the direction of flow at an angle in the range of from 10° to 15° from the horizontal and within 5 mm of the underside of the plate member.

18. A process according to claim 8 wherein the method includes purging the system of excess of the liquid to be evaporated, rinsing the system with water, passing an aqueous acid wash liquid comprising a mixture of phosphoric and nitric acid through the system, passing an aqueous caustic solution comprising potassium and/or sodium hydroxide through the system, purging the wash liquids from the system and rinsing the system with water.

19. A method according to claim 8 wherein the turbidity of the wash liquid after passing through the effect is monitored to determine the rate of removal of deposits from the inner surfaces of the effects and thereby determine when cleaning is completed.

20. A method according to claim 8 wherein the liquid to be evaporated is milk or a product of milk.

21. A method according to claim 8 including the steps of measuring a rate of flow of wash liquid which has passed through each effect, comparing the measured rate of flow with a predetermined normal rate of flow and producing a signal when the measured rate of flow is below said predetermined rate of flow.

22. A method according to claim 8, wherein the header chamber of each of said effects has an inlet and a product line connected to said inlet for supplying the liquid to be concentrated into said header chamber, said branched wash liquid feed line being branched from said inlet line for providing said parallel feeding of wash liquid to the header chamber.

* * * * *